United States Patent
Fung et al.

[11] Patent Number: 6,069,939
[45] Date of Patent: May 30, 2000

[54] COUNTRY-BASED LANGUAGE SELECTION

[75] Inventors: Elizabeth Y. Fung, Bridgewater; Shubert A. Hau, Wayne; Walter H. Hawkins, Freehold; A. Helen McGrath, Summit; Christine Patricia Peterson, Fords, all of N.J.

[73] Assignee: AT&T Corp, New York, N.Y.

[21] Appl. No.: 08/966,878

[22] Filed: Nov. 10, 1997

[51] Int. Cl.[7] .................................................. H04M 1/64
[52] U.S. Cl. .................. 379/67.1; 379/88.05; 379/88.06
[58] Field of Search ....................... 379/67.1–68, 88.04, 379/88.05–88.06, 88.19–88.21, 111–119, 120, 127, 133–134, 69–70, 76, 80, 84, 142

[56] References Cited

U.S. PATENT DOCUMENTS

| 5,333,180 | 7/1994 | Brown et al. ........................ 379/89 |
| 5,353,335 | 10/1994 | D'Urso et al. ..................... 379/67 |
| 5,392,343 | 2/1995 | Davitt et al. ...................... 379/212 |
| 5,440,615 | 8/1995 | Caccuro et al. ................... 379/67 |
| 5,506,893 | 4/1996 | Billings et al. . |
| 5,539,809 | 7/1996 | Mayer et al. . |
| 5,835,568 | 11/1998 | Bass et al. ....................... 379/88.06 |
| 5,875,422 | 2/1999 | Eslambolchi et al. ............. 704/3 |

*Primary Examiner*—Curtis A. Kuntz
*Assistant Examiner*—Duc Nguyen

[57] ABSTRACT

A method for providing a called party with audio messages/prompts in a language selected by the caller or a language spoken in the called party's geographic location comprises the steps of determining the geographic location of the called party; selecting a language from a plurality of language selections by a calling party for delivery of audio prompts to the called party in response to the determined geographic location of the called party; and providing the called party with audio messages/prompts in a selected language. Alternatively, the called party may be provided with audio prompts/messages in a language selected by a calling party through a method comprising the steps of determining dialed digits that identify the called party; selecting a language from a plurality of languages for delivery of audio prompts in response to determined dialed digits; and providing the called party with audio prompts in a language selected by the calling party.

75 Claims, 8 Drawing Sheets

FIG. 8

| ANI | SUBSCRIBER STATUS | COUNTRY CODE | COUNTRY | CITY/REGION CODE | CITY/REGION | LANGUAGE/ DIALECT |
|---|---|---|---|---|---|---|
| 499 944 499 | YES | 93 | AFGHAN-ISTAN | — | — | |
| | | ⋮ | ⋮ | ⋮ | ⋮ | ⋮ |
| | | 91 | INDIA | ⋮ | ⋮ | ⋮ |
| | | | | 755 | BHOPAL | ACCENT ENGLISH |
| | | | | ⋮ | ⋮ | ⋮ |
| | | | | 44 | MADROS | TAMIL |
| | | | | ⋮ | ⋮ | ⋮ |
| | | | | 261 | SURAT | MALAYALAM |
| | | ⋮ | ⋮ | ⋮ | ⋮ | ⋮ |
| | | 507 | PANAMA | — | — | SPANISH |
| | | ⋮ | ⋮ | ⋮ | ⋮ | ⋮ |

FIG. 9

| ANI | SUBSCRIBER STATUS | COUNTRY CODE | COUNTRY | CITY/REGION CODE | CITY/REGION | IS A LANGUAGE/DIALECT SELECTED FOR DIALED COUNTRY OR CITY/REGION | LANGUAGE OR DIALECT SELECTED BY THE CALLING PARTY |
|---|---|---|---|---|---|---|---|
| 499 944 444 | YES | ...... | ...... | ...... | ...... | ...... | ...... |
| | | 54 | ARGENTINA | 231 | AZUI | YES | FRENCH |
| | | | | 91 | BHIA BLANCA | NO | DEFAULT LANGUAGE OR DIALECT |
| | | ... | ... | ... | ... | ... | ... |
| | | | | 531 | VILLA MARIA | YES | ENGLISH |
| | | ...... | ...... | ...... | ...... | ...... | ...... |
| | | 45 | DENMARK | — | — | YES | GERMAN |
| | | ... | ... | ...... | ...... | ...... | ...... |

| ANI | SUBSCRIBER STATUS | COUNTRY CODE | COUNTRY | CITY/REGION CODE | CITY/REGION | SPECIFIC PHONE NUMBER (SPN) | LANGUAGE OR DIALECT SELECTED FOR THE DIALED NUMBER |
|---|---|---|---|---|---|---|---|
| 444 944 4 | YES | ...... | ...... | .......... | .......... | .......... | .......... |
| | | 61 | AUSTRALIA | 7 | BRISBANE | 222 2222 | FRENCH |
| | | | | ... | ... | ... | ... |
| | | | | 9 | PERTH | 333 3333 | ITALIAN |
| | | ... | ... | ...... | ...... | ...... | ...... |
| | | 856 | LAOS | — | — | 444 4444 | ENGLISH |
| | | ... | ... | ...... | ...... | ...... | ...... |

FIG. 10

COUNTRY-BASED LANGUAGE SELECTION

BACKGROUND OF THE INVENTION

1. Technical Field

This invention relates to the field of international dialing services and, more particularly, to a method and an apparatus for automatically providing a called party with audio prompts in a language or dialect that has been selected by the calling party for the called party or is generally spoken in the called party's geographic location.

2. Description of Related Arts

With automatic international services as currently offered by AT&T, when a calling party places an international phone call, a called party will receive audio prompts or announcements in a language that is a default language chosen by the toll carrier (AT&T). Currently, the default language is English. Alternatively, the calling party may select one language, in place of the default language, from a selection of available languages, for example, Spanish, which may be the native language of the caller or called party or both. (It is well known that Spanish is perhaps the most spoken language derivative of the Latin or Roman-based languages and is a popular alternative language of choice in the United States.)

A problem with the present system is that the called party may not be able to understand the language of the prompts/announcements because it may not be the language spoken in the calling party's geographic location or be the language of the called party and, therefore, the called party may not understand the meaning of the audio prompts from an operator or announcement system. For example, consider a son living in the United States who speaks both English and French. If the son desires to call his mother who lives in Paris and only speaks French, then the mother will not understand any of the audio prompts because the prompts may be provided in English from the toll carrier based in the United States, unless the son has specifically selected French as the son's only alternative choice to the default English.

U.S. Pat. No. 5,539,809 issued to Mayer et al. relates to messages produced by a telecommunications network that give the calling party information about the called party's geographic location. In the detailed description, Mayer illustrates a system for informing a calling party, who has placed an international call, about various information specifically related to the called party's geographic location. Mayer provides that during the time required for processing an input international telephone number- including the country and city codes, the calling party will be provided with information such as the time of day, date, news, and weather specifically related to the called party's geographic location.

Mayer et al., however, does not provide any new or novel service designed for the benefit of the called party. Rather, Mayer is predicated on improving services for the calling party by occupying the delay time with useful and entertaining information geared toward the calling party.

U.S. Pat. No. 5,506,894 issued to Billings et al. relates to a system for identifying, forwarding, and delivering to the called party information regarding the originating country of a toll-free international call. Billings describes a system that would allow an international toll-free subscriber, the called party, to receive background information about the calling party's country. For example, Billings would enable the called party to offer personalized services based upon the country or location of the calling party by connecting the calling party to specialized attendants fluent in the calling party's native language and familiar with the calling party's currency. In addition, Billings describes a system that can map the calling party's country code and display the calling party's country to the called party. In the case of data calls, Billings allows the calling party to be directed to a special processor that has the capability of recognizing special characters such as Korean, Cyrillic, and Hebrew letters.

While Billings relates an invention that a called party can subscribe to, the patent does not provide any special services to aid the called party in understanding audio prompts, messages or announcements that may be provided in languages foreign to the called party. Rather, Billings assists the calling party with language difficulties but fails to provide any remedies for the language barriers experienced by the called party. Thus, Billings, like Mayer, is primarily designed to aid and improve the calling party's ability to communicate during international calls. Also, the costs involved in employing specialized attendants, as described by Billings, would be prohibitive.

Consequently, it is an object of this invention to increase the ease of placing international phone calls by enabling the calling party to provide prompts for called parties in the language that is spoken in the called party's geographical location or in a plurality of foreign languages selected by the calling party for the called parties that the calling party frequently calls.

SUMMARY OF THE INVENTION

The present invention provides for a Country-Based Language Selection (CBLS) service that enables a calling party to provide a called party with prompts/announcements in a language or dialect that is familiar to the called party. Specifically, the present invention allows the calling party to provide prompts/announcements to the called party in the language or dialect that is spoken in the called party's geographic location. Alternatively, the present invention also allows the calling party to select a plurality of languages or dialects for providing prompts/announcements to a limited number or to as many called parties in as many countries as the calling party desires. For example, a French-speaking son in the United States may select French for calls to his French-speaking mother, even if she is in Japan. As defined herein, the prompts/announcements may also include messages and instructions.

A distinguishable feature of the present invention over the prior art is that the present invention provides a service that should help the called party overcome various languages difficulties experienced during the completion of an international call. As a result, an advantage of the present invention is that it should permit the called party to understand the prompts/announcements that inform and instruct the called party and it should expand the flexibility of choices for the calling party.

A method for providing the called party with prompts/announcements in a language or dialect spoken in the called party's geographic location in accordance with the teachings of the present invention comprises the steps of determining the geographic location of the called party; selecting a language from a plurality of languages for delivery of audio prompts to the called party in response to either a determined geographic location of the called party or a selection of a plurality of languages by the calling party for their called parties; and providing the called party with audio prompts/announcements in the selected language.

In an alternative embodiment, a method for providing a called party with audio prompts in a language selected by a calling party in accordance with the teachings of the present invention comprises the steps of determining dialed digits that identify the called party; selecting a language from a plurality of languages for delivery of audio prompts/ messages in response to determined dialed digits; and providing the called party with audio prompts/announcements selected by the calling party for the called party.

The present invention of prompting the called party in a language familiar to the called party may be implemented by a network adjunct call processor associated with any switching office used in establishing an international call and preferably associated with a toll office or an international gateway switching center. The network adjunct processor comprises of an interactive voice system for delivering audio prompts/announcements in various languages or dialects. The network adjunct processor also contains a database management system that stores the various records such as the subscription status of the calling party, the languages selected for the called party, the country codes and the corresponding countries, and so forth. Data transport facilities couple together the various elements of the network adjunct processor with the toll network. Moreover, the apparatus for accomplishing the present methods may be implemented within the software and hardware of the international gateway switch itself, for example, a #4ESS electronic switching system available from Lucent Technologies, Inc.

In one embodiment of the present invention, the toll switch or an international gateway switch recognizes that the calling party has subscribed to the present service and passes off call processing to the adjunct. The network adjunct processor then looks up subscriber records and choices made. If no choices are made, the dialed digits will determine default languages based on the country/city codes dialed. For example, a caller who is a subscriber to the present service dialing French-speaking Quebec in Canada will receive a default language selection of French for announcement/prompts for the called party and English for a call to British Columbia. On the other hand, the caller may intentionally select English for prompts/announcements for called parties in Quebec if the caller so desires.

These and other features of the present invention will become clear from reading the detailed description of the drawings that follow.

BRIEF DESCRIPTION OF THE DRAWINGS

FIG. 8 represents a sample of a caller table used by the network adjunct processor 60 in an embodiment of the present invention where a geographic location of a called party determines the language or dialect for delivery of audio prompts.

FIG. 9 represents sample of a caller tables used by the network adjunct processor 60 in an embodiment of the present invention where a calling party selects a language or dialect for delivery of audio prompts to a country or city.

FIG. 10 represents a sample of the caller table used by the network adjunct processor 60 in an embodiment of the present invention where a calling party selects a language or dialect for delivery of audio prompts to a specific phone number.

DETAILED DESCRIPTION

Figure 1:
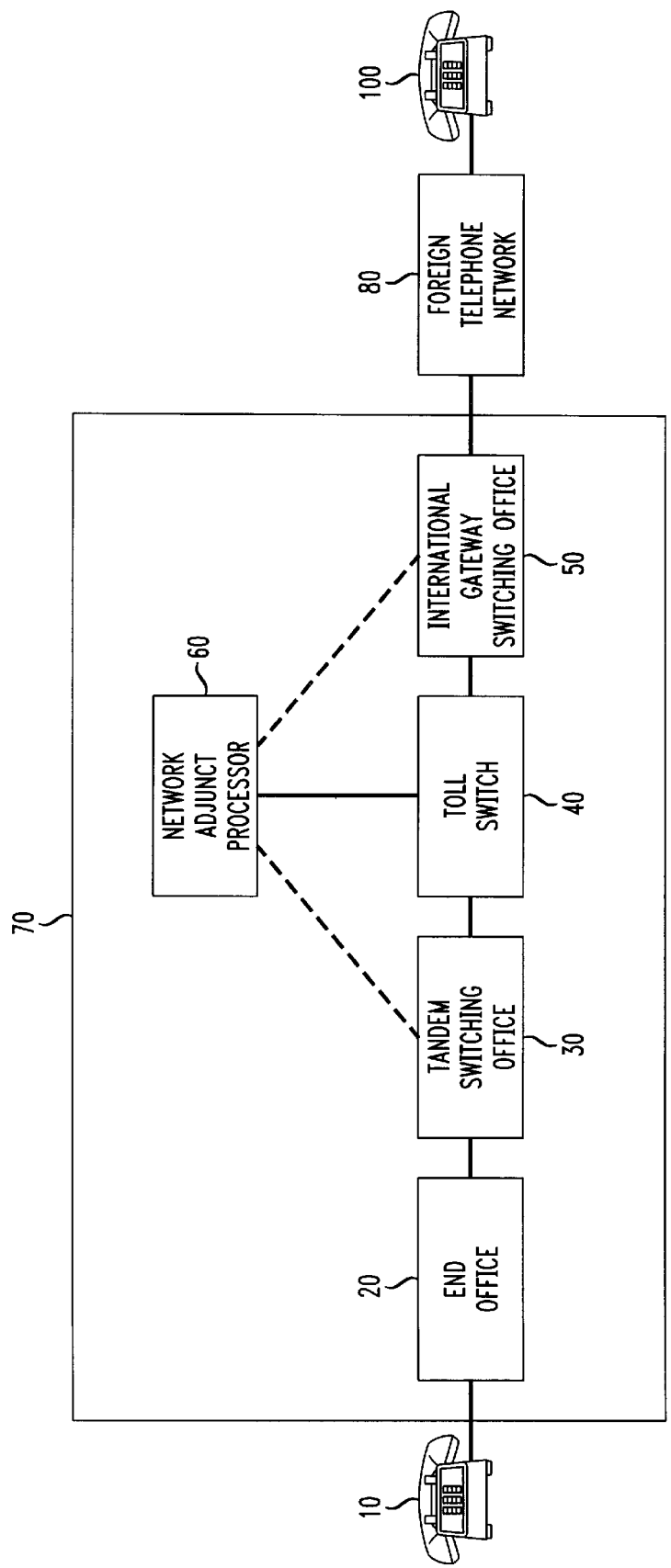
FIG. 1 represents a schematic drawing of a typical telephone network comprising a domestic telephone network 70 and foreign telephone network 80 useful for explaining an international call completion according to the present invention, the domestic telephone network 70 includes an international gateway switching office 50 and an associated network adjunct processor 60 in accordance with one embodiment of the present invention.

Referring to FIG. 1, there is shown a typical world-wide telephone network comprising a domestic switched telephone network 70 and a foreign telephone network 80. The domestic switched telephone network 70 may connect to multiple foreign telephone networks 80, where different foreign telephone networks 80 may correspond to various foreign countries. In the present figure, however, only one foreign telephone network 80 is depicted. The International Telecommunications Union (sometimes referred to as the ITU or the UIT, formerly the CCITT) of the United Nations assists various countries in agreeing upon uniform standards for international call processing. In the United States, a calling party at station 10 must dial 0-1-1 in order to signal to the end office 20 in the calling party's local exchange area that the calling party desires to place an international phone call. The series of digits that immediately follow 0-1-1 represent a country code and a city code. The city code may represent a surrounding region or there may exist in certain national dialing plans a specific region code distinct from country and city codes. Those digits are followed by the telephone number of the called party station 100 that the calling party desires to reach.

Once the end office 20 receives the 0-1-1 digits, the end office 20 knows that the following digits are to be forwarded to toll office 40 via a tandem or toll office 30 for forwarding to an international gateway switching office 50 of a domestic toll carrier that can connect to the foreign telephone network 80, which corresponds to the country code digits. The end office 20, for example, may signal the toll switch 40 through an in-band or a more modern out-of-band signaling system. The end office 20 may forward the dialed digits and the automatic number identification (ANI) data, which identifies the calling party by the calling party station 10 telephone number.

After the international gateway switching office 50, for example a #4ESS switch available from Lucent Technologies, Inc., receives the country code, city/region code, and called party's telephone number, the international gateway switching office 50 is in a position to look both ways to establish links to the calling party station 10, if not yet established, and to the called party station 100. In the prior art relating to in-band signaling, the communication links through the tandem or toll switching offices 30 and a toll switching office 40 associated with network adjunct processor 60 are determined at the time of signaling to the international gateway switching office 50. That is, the end office 20 attempts to reach the international gateway switching office 50 by establishing communication links through, for example, the tandem/toll switching office 30, toll switching office 40, and finally to the international gateway switching office 50. In more modern out-of-band signaling systems, such as the SS-7, the communication links are determined after signaling. Under either scenario, the communication path between the calling party station 10 and the international gateway switching office 50 is typically determined at or before the time that the international gateway switching office 50 begins to reach the foreign telephone network 80. The international gateway switching office 50 then signals the foreign telephone network 80 by forwarding the dialed city/region code and the called party station 100 telephone number.

Figure 3:
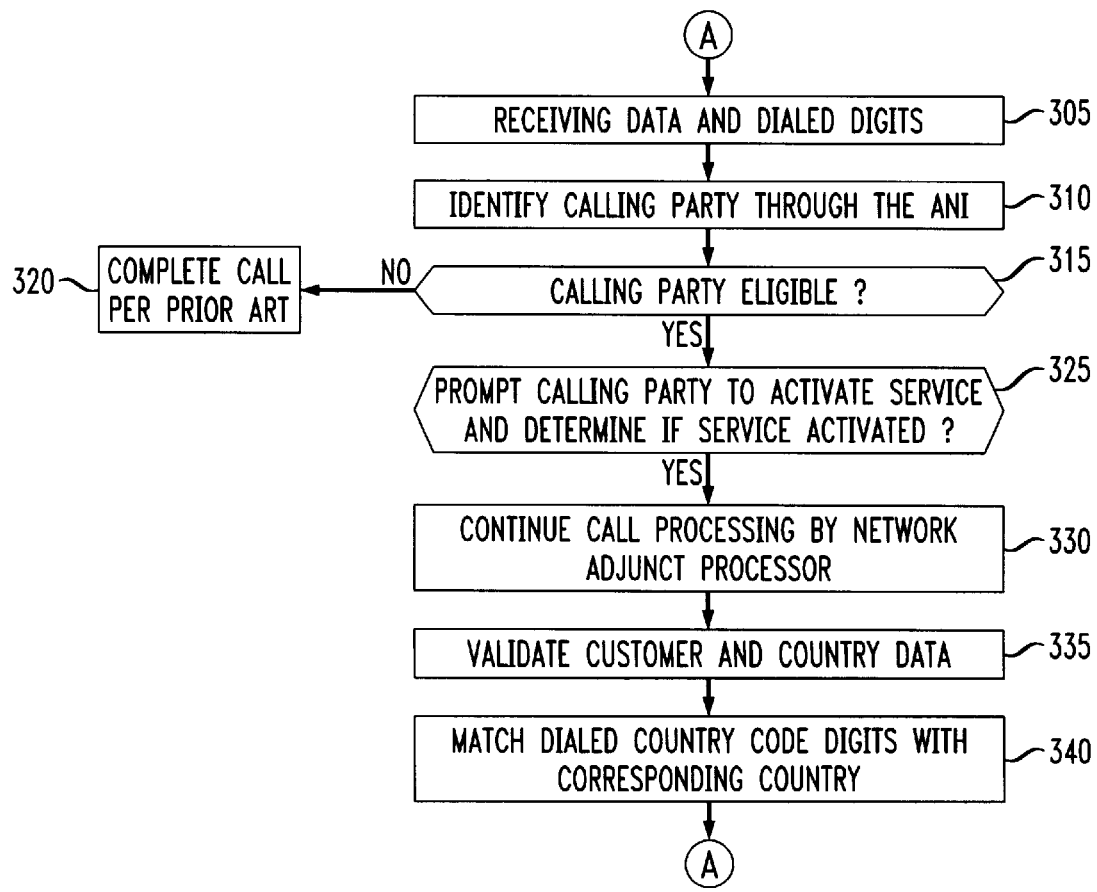
FIG. 3 represents a call processing subroutine that may be implemented in various embodiments of the present invention.

The present invention, as will be further described in detail in connection with a discussion of FIG. 3, relates to what happens when the communication links between the calling party station 10 and the called party station 100 are established. According to the prior art, once the links are established, the called party may receive prompts in a default language or one that has been selected by the calling party from a selection of language choices. For example, a called party in France receiving a call from United States typically will be prompted in English but may receive a prompt in French but only if that single choice has been made by the calling party.

If, however, and according to the present invention the calling party has subscribed to the Country Based Language Selection (CBLS) service, the called party may be alternatively offered prompts in the language or dialect spoken in the called party's geographic location. The dialed country code (and possibly city code or even region code) are looked to for basing a language choice made automatically by the network. In the alternative, the calling party may select a language for the called party for a country, for a country/city code combination or on a party by party basis or as an override of the automatic language selection. It may be a further embodiment of the present invention to permit the called party to identify language selections for prompts to the subscriber as well for calls to others than subscribers in the domestic network from the calling party's foreign network.

Figure 2:
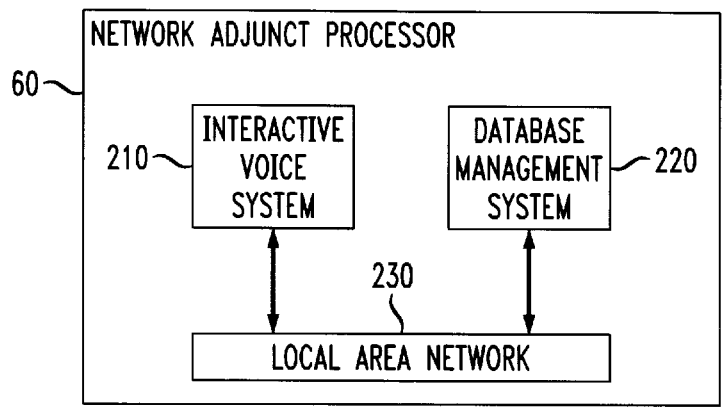
FIG. 2 represents a functional block diagram of the network adjunct processor 60 introduced in FIG. 1.

Referring to FIG. 2, system functions related to the CBLS service are, in one embodiment, performed by a network adjunct processor 60 associated with the domestic switched telephone network 70. As such, the network adjunct processor 60 may be a shared resource of tandem switching offices 30, toll switching offices 40, or international gateway switching offices 50 dispersed throughout the domestic switched telephone network 70 (a solid link to a toll office 40 is shown; optional links are shown in dashed lines). Although FIG. 2 illustrates the network adjunct processor 60 as comprising part of the domestic switched telephone network 70, the features of the network adjunct processor 60 may be provided by stand-alone equipment if desired. Alternatively, the functions described as associated with the network adjunct processor 60 may similarly be provided by any alternative office in the domestic switched telephone network 70 including the end office 20, the tandem switching office 30, the toll switching office 40, the international gateway switching office 50, or at an office within the foreign telephone network 80.

The adjunct office processor 60 comprises an interactive voice system 210 that may or may not be conversant, as it simply may provide prompts and announcements responsive to a call processing event, or it may prompt the calling party or the called party to provide further input and thus be conversant. Interactive voice systems are known, for example, from Lucent Technologies Inc. or Nortel. The calling party may respond to the interactive voice system 210 by using touch tone keypads or by speaking to speech recognition circuits included in the interactive voice system 210. Likewise, the called party may speak a response to a prompt that may be interpreted by the interactive voice system 210 or use their touch tone keypads to communicate. The interactive voice system 210 comprises tables for generating prompting/announcements/messages in a language of the called party. If touch tone signaling is used, the interactive voice system 210 may comprise dualtone multi-frequency (DTMF) receivers for receiving the touch tone signals initiated by the caller in response to the prompt. The database management system 220 processes and maintains subscriber records, call status tables, called party dialed address digit data, country/language/time of day tables and the like among other data. An ANI system (not shown) of the connecting local, tandem or toll office identifies the calling party through the calling party's station 10 telephone number. A local area network (LAN) 230 supports the data communication between the various elements of the network adjunct processor 60.

Now referring to FIG. 1 and FIGS. 3–7, various call processing methods for providing the CBLS service will be explained in greater detail. Specifically, FIG. 3 depicts a flow diagram of a sequence of events that may occur in various embodiments of the present invention. The circled letter A represents the entire subroutine depicted in FIG. 3. When a subscriber signs up for CBLS service, the subscriber will be invited to select certain languages or dialects of languages for delivery of prompts to called parties the called party may call anywhere in the world. The caller may select French for prompts/announcements in a call to their French-speaking mother in Japan. Thus, they may store a personal selection of languages for countries, cities even individuals they plan to call. Otherwise, a language/dialect choice may be made automatically for the caller based on the dialed digits of the call.

According to box 305 and referring to FIG. 1, after the calling party station 10 initiates an international phone call to the called party station 100, a combination of the tandem switching office 30, the toll switch 40, and the international gateway switching office 50, which comprise part of the domestic telephone network 70, receives data representing the calling party station 10 telephone number and the dialed digits of the called party station 100 either through an in-band or out-of-band signaling system. The older in-band systems require the establishment of successive communication links from the end office 20, perhaps, through the tandem office 30 and the international toll switch office 40 to the international gateway switching office 50. In newer out-of-band systems, the international gateway switching office 50 receives the signaling data through a data communications channel, for example, via a SS-7 system, before communication links are established.

According to box 310, the domestic telephone network 70 identifies the calling party through the ANI forwarded by the end office 20. At box 315, the toll center 40 determines what services the subscriber has subscribed to. If the subscriber has subscribed to special services, the call is processed further at a network adjunct. The network adjunct processor 60 determines whether the calling party is eligible for CBLS. Caller tables for the various services available are provided. Through a look-up of the calling party's ANI data, the database management system 220 determines whether the calling party subscribes to the CBLS service. If the calling party does not subscribe to the CBLS service, then the call processing continues per prior art methods at box 320, for example, by providing prompts only in English (default language) to the called party or in a single language selected by the calling party. If the calling party subscribes to the CBLS service, then the interactive voice system 210 prompts the calling party to activate the CBLS service at box 325. If the calling party activates the service, then the network adjunct processor 60 continues the call processing functions, indicated by box 330 labeled "Continue Call Processing by Network Adjunct Processor". If the calling party fails to activate the service, then the call processing continues per prior art methods.

At box 335 labeled "Validate customer and country data", the database management system 220 performs a validation of the calling party station 10, for example, by using the ANI to determine whether the calling party station 10 is susceptible to fraud control or other security measures. The tasks associated with box 335 may also include look-up of other services that the calling party subscribes to. The tasks may further include call blocking, for example, if the calling party has not paid a bill or has otherwise an unfavorable record with the toll carrier. Other database management services, not relevant to the present invention, are also performed. Country data may represent, as will be further described herein, country and (or) city/region codes dialed by the calling party. After the database management system 220 validates the customer and country data, the call processing proceeds to step 340, where the database management system 220 searches the caller tables to match the dialed country code digits with the corresponding valid country data.

Figure 4:
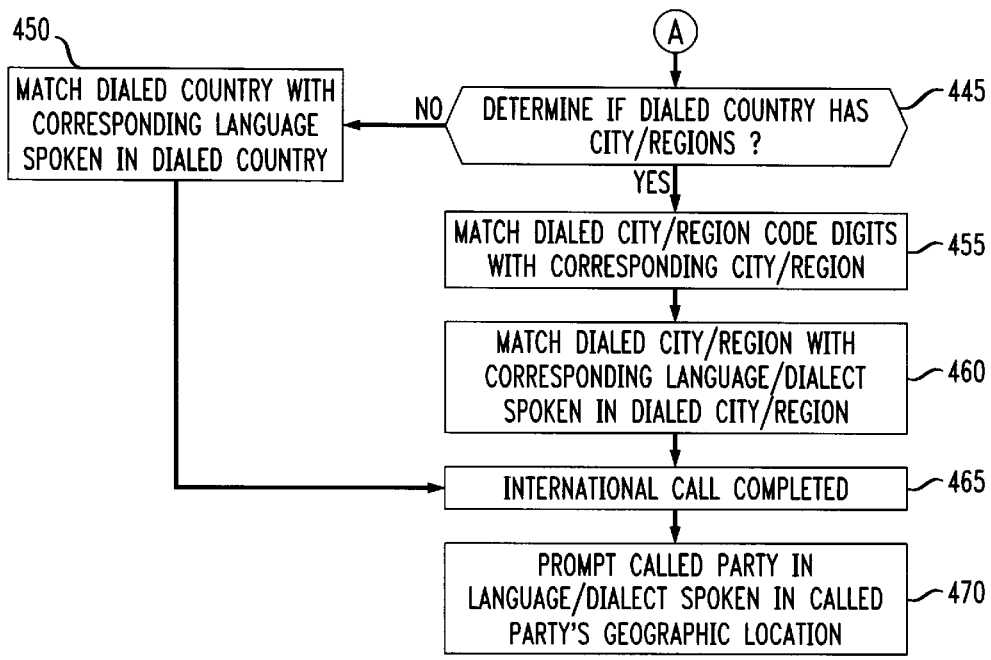
FIG. 4 represents an embodiment of the present invention where a geographic location of a called party determines the language or dialect for delivery of audio prompts.

FIG. 4 represents one embodiment of the present invention. Initially, the network executes the call processing subroutine depicted in FIG. 3. Then, as indicated by box 445, the network adjunct processor 60 determines whether the dialed country divides into various city/regions for the purposes of an international phone call. If the network does not receive any dialed city/region code digits, then the dialed country does not divide into city/regions and the call processing proceeds to box 450. At box 450, the database management system 220 searches the caller established tables to match the dialed country with the corresponding language that the caller has selected or an automatic selection which is generally spoken in the dialed country. If, however, the network receives the dialed city/region code digits, then the call processing proceeds to box 455.

According to box 455, the database management system 220 searches the caller tables in order to match the dialed city/region code digits to the corresponding city/region. At box 460, the database management system 220 searches the caller tables to match the dialed city/region code with the corresponding language that the caller has selected or is the language or dialect of the language spoken in the dialed city/region. At box 465, the network completes the international call. In in-band signaling systems, that means establishing communication links between the calling party station 10 and the international gateway switching office 50. In out-of-band systems, the communication links to the international gateway switching office 50 may be already presumed to be established. In either case, the international gateway switching office 50 signals the foreign telephone network 80 and forwards the necessary dialed digits and ANI data for completing the call to the called party station 100. At box 470, when the called party answers the call, the interactive voice system 210 produces the appropriate audio prompts in the language or dialect selected by the calling party for the called party or the automatic selection of the language/dialect spoken in the called party's geographic location.

Thus, according to the first embodiment of the invention, a language or dialect for prompting the called party is selected by the calling party for the dialed number. In a second embodiment, the language is selected according to a dialed country code and a corresponding match with a language selected by the calling party for that dialed country code or the language spoken in the called party's country (the automatic selection) when the calling party has not made a selection. In a third embodiment, the city code may be further used to select a language for prompting the called party when different city/regions within one country speak different languages or dialects. In a fourth embodiment, the entire dialed number may specify a called party and a language choice made by the calling party for that called party.

Figure 5:
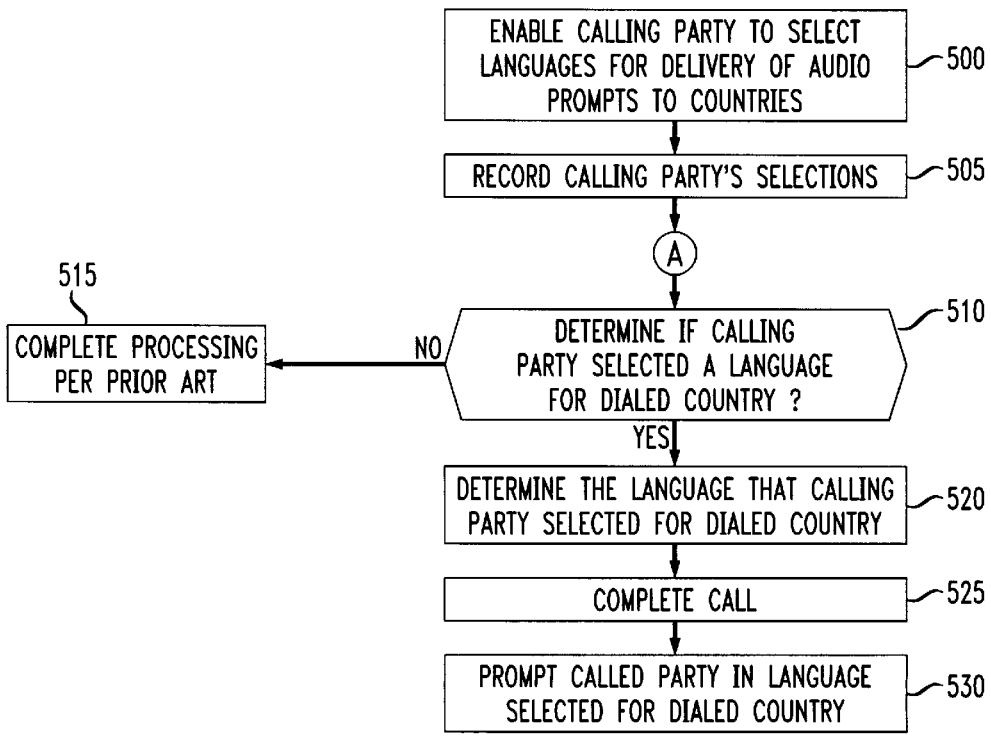
FIG. 5 represents an embodiment of the present invention where a calling party selects a language for delivery of audio prompts to a country.

FIG. 5 illustrates a preferred embodiment of the present invention. At box 500, prior to any call processing steps depicted in FIG. 3, a calling party selects two specific languages for delivery of messages to two or more specific countries. This allows the calling party to customize the languages for delivery of messages for specific countries. For example, the calling party may select 10 French for delivery of messages whenever the calling party places a call to England, Sweden, or France, and the calling party may select Hebrew for any calls to Italy or Chile.

At box 505, the database management system 220 stores the calling party's language and country selections in memory in a caller table. Next, the network implements the subroutine depicted in FIG. 3. At box 510, the database management system 220 searches the caller tables to determine whether the calling party selected a language for delivery of messages to the dialed country. If the calling party failed to select at least two languages for two or more countries, then the call processing continues per prior art at box 515. Since the calling party selected three languages for delivery of messages, then, at box 520, the database management system 220 searches the caller tables to determine the specific language selected for the dialed country. At box 525, the network completes the international call. At box 530, when the called party answers the call, the interactive voice system 210 prompts the called party in the language that the calling party selected for the dialed country.

In yet another preferred embodiment of the present invention, the network may enable a calling party to select a limited amount of languages for delivery of audio prompts to a limited amount of countries. For example, the calling party can select three languages for delivery of messages to three or more different countries. That is, the calling party can select French for delivery of messages to France and other French speaking countries, Spanish for delivery of messages to Canada and Spanish speaking countries, and Russian for delivery of messages to Chile as well as to Russia. This may occur when the calling party places a call to, for example, a Russian relative in Chile, even though the predominant language in Chile may be Spanish.

Figure 6:
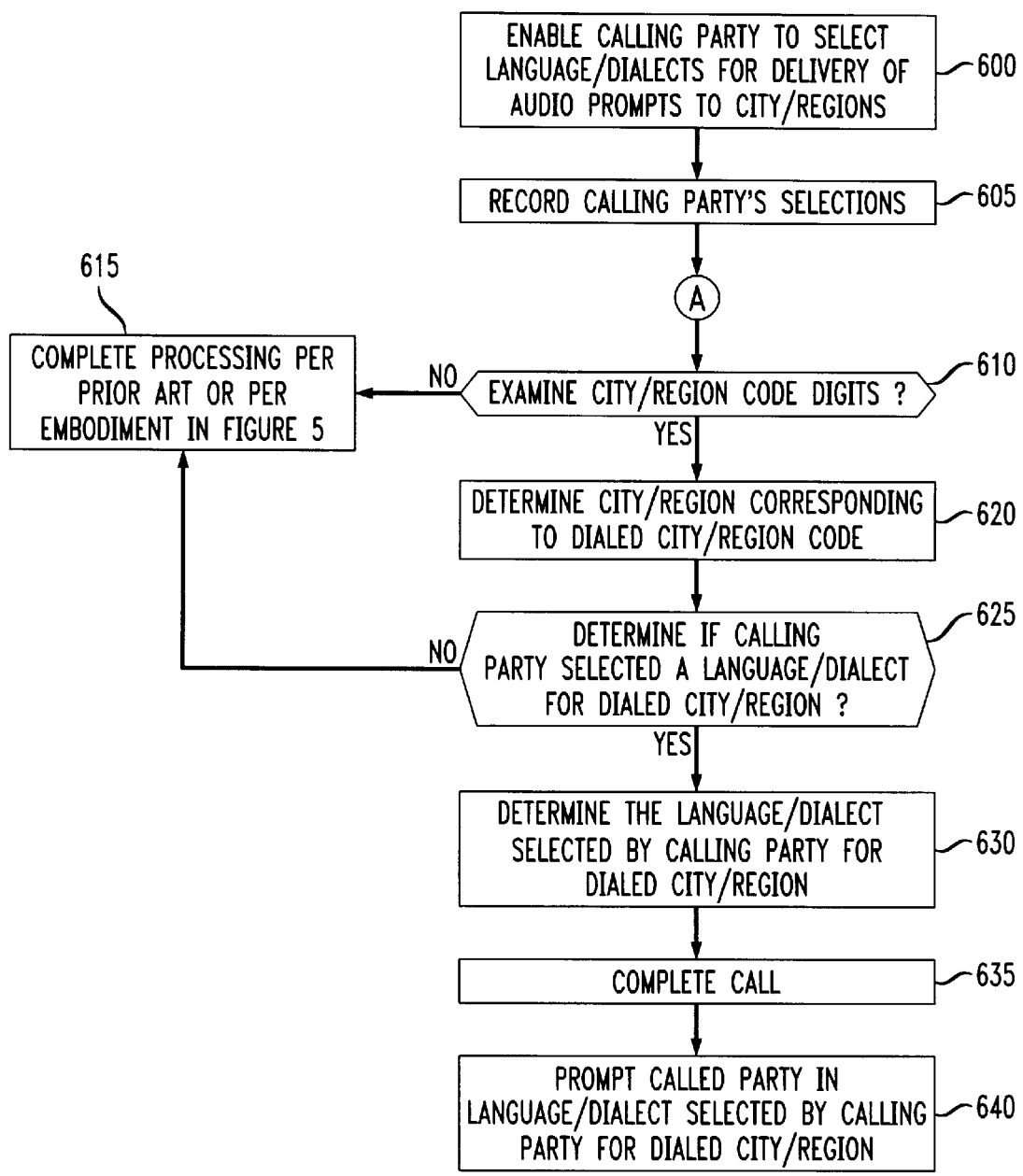
FIG. 6 represents an embodiment of the present invention where a calling party selects a language or dialect for delivery of audio prompts to a city.

FIG. 6 illustrates another preferred embodiment of the present invention. At box 600, prior to any call processing steps depicted in FIG. 3, a calling party selects certain languages or dialects for delivery of messages to certain cities. This embodiment allows the calling party to customize the language or dialect for delivery of audio prompts for each city within each country. For example, Vancouver, British Columbia, Canada may receive prompts in English and Quebec City, Quebec, Canada may receive prompts in French.

At box 605, the database management system 220 stores the calling party's language or dialect and city selections in memory in a caller table. Next, the call processing continues as depicted in FIG. 3. At box 610, the network examines dialed city/region code digits that were received. If the network does not examine city code digits, then the call processing proceeds to box 615. At box 615, the call processing may continue per prior art processes, or it may continue the call processing as depicted in the embodiment in FIG. 5.

Next, at box 620, the database management system 220 determines the city that corresponds to the dialed city code. At box 625, the database management system 220 determines whether the calling party selected a specific language or dialect for delivery of messages to the dialed city. If the calling party failed to select a specific language or dialect, then the call processing continues per prior art processes at box 615 (either a default language or a single language selection). If the calling party selected a language or dialect for delivery of audio prompts to the dialed city, then, at box 630, the database management system 220 searches the caller tables to determine the language or dialect that the calling party selected for delivery of prompts to the dialed city. At box 635, the network completes the international call. At box 640, when the called party answers the call, the interactive voice system 210 prompts the called party in the language or dialect that the calling party selected for the dialed city.

In another preferred embodiment, the network may enable the calling party to select a limited number of languages or dialects for delivery of audio prompts to a limited number of cities. Moreover, the concept may be extended to include a region-based language selection by a calling party subscribe or an automatic selection determined by the dialed region.

Figure 7:
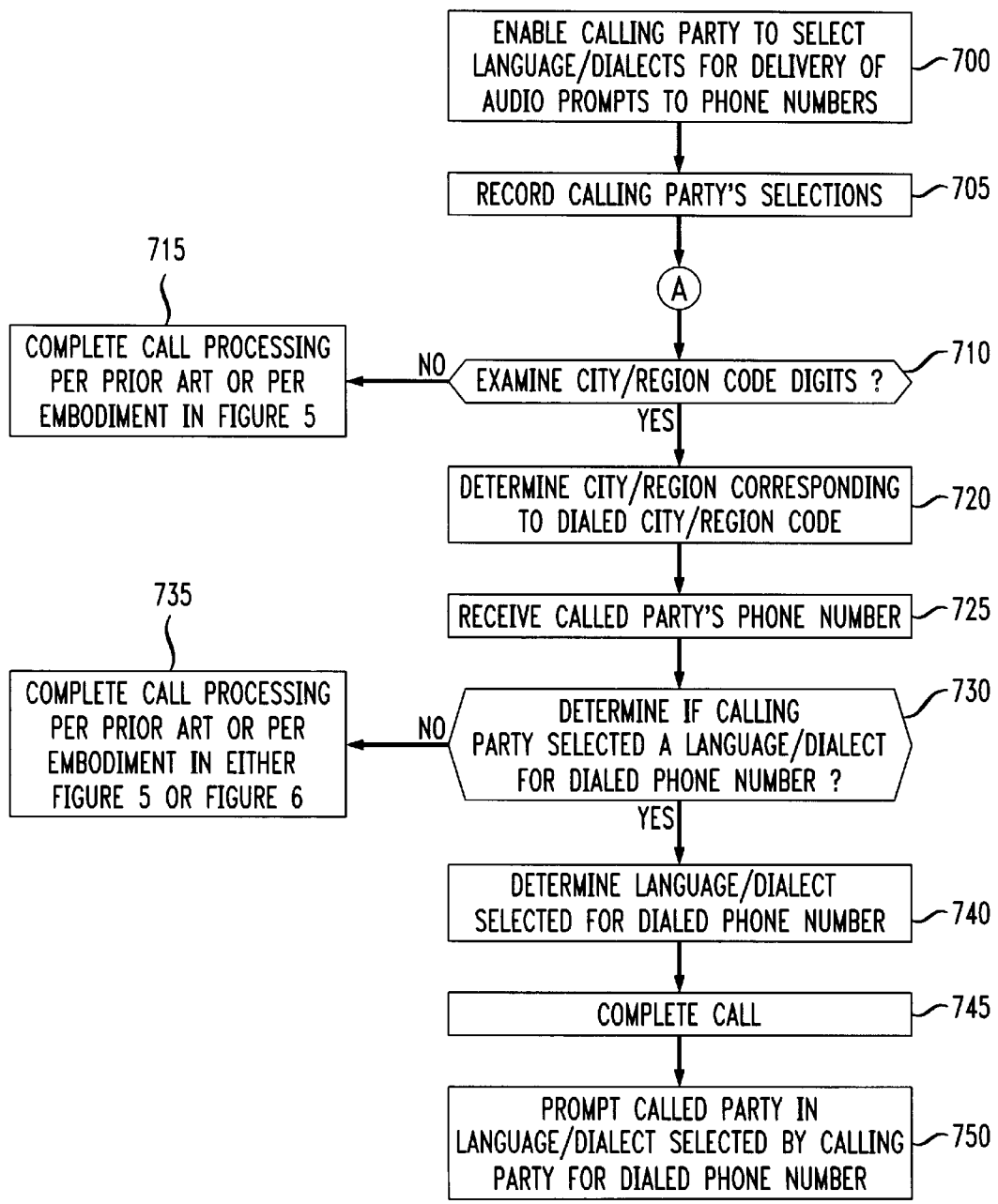
FIG. 7 represents an embodiment of the present invention where a calling party selects a language or dialect for delivery of audio prompts to a specific phone number.

FIG. 7 illustrates another preferred embodiment of the present invention. At box 700, prior to any call processing steps depicted in FIG. 3, a calling party selects specific languages or dialects for delivery of messages to specific phone numbers. This embodiment allows the calling party to customize the language or dialect for delivery of messages to the called party at a specific phone number. For example, the calling party can select Spanish for delivery of messages to one friend in Paris and the calling party can also select Italian for delivery of messages to another friend in Paris. Others in Paris may receive prompts according to a city code based selection by the calling party or an automatic selection.

At box 705, the database management system 220 stores the calling party's selections in a memory in a caller table. Next, the call processing continues as depicted in FIG. 3. At box 710, the network examines dialed city code digits that were received. If the network does not examine the city code digits, then the call processing proceeds to box 715. At box 715, the call processing may continue per prior art processes or it may continue according to the embodiments depicted in FIG. 5. If the network processor processes the city code, then the call processing continues at box 720, where the database management system 220 determines the city that corresponds to the dialed city code.

After receiving the called party's phone number at box 725, the database management system 220 determines whether the calling party has selected a language or dialect for the dialed phone number in the city at box 730. If the calling party failed to select a language or dialect for the dialed phone number, then the call processing continues per prior art methods or according to the embodiment in FIG. 5 or FIG. 6. If, however, the calling party selected a language or dialect for the dialed phone number then the call proceeds to box 740.

At box 740, the database management system 220 searches the caller tables to determine the specific language or dialect that the calling party selected for delivery of messages to the dialed phone number. At box 745, the network completes the international call. At box 750, when the called party answers the call, the interactive voice system 210 prompts the called party in the language or dialect selected by the calling party for the called party.

In another embodiment, the network can enable the calling party to select a limited number of languages or dialects for delivery of messages to a limited number of phone numbers that the calling party will be dialing. For example, the calling party may customize a personal directory of numbers and corresponding language selections that will be maintained by the network.

In another embodiment, according to the '809 patent referenced above, while the calling party is waiting for the call to go through announcements such as the time of day and weather specific related to the called geographic location may be provided to the calling party.

Referring to FIG. 8, there is a sample of a caller table employed by the network adjunct processor 60 in an embodiment where the called party determines the language or dialect for delivery of audio prompts or the selection is an automatic selection based on the language typically spoken according to the dialed digits of the called party. The first column stores the calling party's ANI information for a subscriber database of a domestic or foreign network CBLS service offering. The ANI column directs the database management system 220 to the second column, which indicates whether the calling party is a subscriber to the CBLS service. The third and fourth columns contain the country codes and corresponding country names, respectively. The fifth and sixth columns contain the city/region codes and the corresponding city/region names. The seventh column contains the language or dialect that is selected by the calling party or is spoken in the dialed country or city/region. A dash signifies that there is no information stored in a particular column and that the network adjunct processor 60 should proceed to the next column. For example, if Afghanistan is not divided into city/regions for the purposes of international calling, then the caller table will have a dash in the city/region column and the network adjunct processor 60 will proceed to the language/dialect column.

Referring to FIG. 9, there is a sample caller table employed by the network adjunct processor 60 in an embodiment where the calling party selects a language or dialect for delivery of audio prompts to a country or city/region. The first column stores the calling party's ANI information. The ANI information directs the database management system 220 to the second column, which indicates whether the calling party is eligible for the service. The third and fourth columns contain the country codes and the corresponding country names, respectively. The fifth and sixth columns contain the city/region codes and the corresponding city/region names, respectively. The seventh column indicates whether the calling party selected a language or dialect to be used for delivery of prompts to the dialed country or city/region. The eighth column contains the language or dialect selected by the calling party. If the calling party did not select a language to be used for the dialed country or city/region, then the called party will be prompted in an automatic default language, typically, but not necessarily, the language spoken by a majority of the residents of the city dialed. A dash signifies that there is no information stored in that particular column and that the network adjunct processor 60 should proceed to the next column.

Referring to FIG. 10, there is a sample of a caller table employed by the network adjunct processor 60 in an embodiment where the calling party selects a language or dialect for delivery of audio prompts to a specific phone number. The first column stores the calling party's ANI information. The ANI information directs the database management system 220 to the second column, which indicates whether the calling party is eligible for the service. The third and fourth columns contain the country codes and the corresponding country names, respectively. The fifth and sixth column contain the city/region codes and the corresponding city/region names, respectively. The seventh column stores the phone number of the called party and the eighth column contains the language or dialect selected by the calling party for prompting the called party at the specific phone number. A dash signifies that there is no information stored in that particular column and that the network adjunct processor 60 should proceed to the next column.

The foregoing is merely illustrative of the principles of the invention and various modifications can be made and come to mind to those of ordinary skill in the art of studying the present specification without departing from the scope and spirit of the invention. For example, different informative messages and types of international redial services may be provided by the adjunct office processor 60 in response to different network conditions. Also, for example, the caller tables do not need to include columns for the country names or city/region names. Different hardware may be used than that shown and suggested that may comprise hardware, firmware or software implementations of the present method. Any United States patents or patent applications cited herein should be deemed to be incorporated by reference to their contents. The invention should only be deemed to be limited in scope by the claims that follow.

We claim:

1. A method for providing a called party with audio prompts in a language selected by a calling party, comprising the steps of
   determining a geographic location of said called party;
   selecting a language or dialect previously determined by said calling party from a plurality of languages for delivery of audio prompts to said called party based on a determined geographic location of said called party; and
   providing said called party with audio prompts in the selected language.

2. The method of claim 1, further comprising the step of analyzing a calling party's automatic number identification (ANI) and confirming that said ANI is eligible for language selection service prior to said steps of determining geographic location, selecting a language, and providing prompts.

3. The method of claim 2, further comprising the step of prompting said calling party to activate said language selection service.

4. The method of claim 1, wherein said determining geographic location step includes the step of analyzing received dialed digits.

5. The method of claim 4, wherein said received dialed digits include digits that alert a network that a calling party desires to make an international call, digits representing a dialed country code, and digits representing said called party's phone number.

6. The method of claim 5, wherein said received dialed digits further include digits representing a dialed city code.

7. The method of claim 1, wherein said determining geographic location step includes the step of determining a dialed country that corresponds to a dialed country code.

8. The method of claim 7, wherein said determining geographic location step includes the step of determining a dialed city that corresponds to said dialed country code and a dialed city code.

9. The method of claim 1, wherein said selecting language step includes the step of selecting a language that corresponds to a dialed country.

10. The method of claim 9, wherein said selecting language step includes the step of selecting a language or dialect that corresponds to said dialed country and a dialed city.

11. A method for providing a called party with audio prompts in a language selected by a calling party, comprising the steps of
    determining dialed digits that identify said called party;
    selecting a language previously determined by said calling party from a plurality of languages for delivery of audio prompts in response to determined dialed digits; and
    providing said called party with audio prompts in the selected language.

12. The method of claim 11, further comprising the step of enabling said calling party to determine specific languages for delivery of audio prompts to specific countries prior to said steps of determining dialed digits, selecting a language, and providing prompts.

13. The method of claim 12, wherein said enabling step includes the step of recording said calling party's determinations.

14. The method of claim 12, wherein said enabling step includes the step of enabling said calling party to determine a limited number of specific languages for delivery of audio prompts to a limited number of specific countries.

15. The method of claim 11, further comprising the step of enabling said calling party to select specific languages or dialects for delivery of audio prompts to specific city/regions prior to said steps of determining dialed digits, selecting a language, and providing prompts.

16. The method of claim 15, wherein said enabling step includes the step of recording said calling party's determinations.

17. The method of claim 15, wherein said enabling step includes the step of enabling said calling party to determine a limited number of specific languages or dialects for delivery of audio prompts to a limited number of specific cities.

18. The method of claim 11, further comprising the step of enabling said calling party to select specific languages or dialects for delivery of audio prompts to specific phone numbers prior to said steps of determining dialed digits, selecting a language, and providing prompts.

19. The method of claim 18, wherein said enabling step includes the step of recording said calling party's determinations.

20. The method of claim 18, wherein said enabling step includes the step of enabling said calling party to determine a limited number of specific languages or dialects for delivery of audio prompts to a limited number of phone numbers.

21. The method of claim 11, further comprising the step of analyzing said calling party's ANI and confirming that said ANI is eligible for language selection service prior to the steps of determining dialed digits, selecting a language, and providing prompts.

22. The method of claim 21, further comprising the step of prompting said calling party to activate said language selection service.

23. The method of claim 11, wherein said determining step includes the step of analyzing received dialed digits.

24. The method of claim 23, wherein said received dialed digits include digits that alert a network that said calling party desires to make an international call, digits representing a dialed country code, and digits representing said called party's phone number.

25. The method of claim 24, wherein said received dialed digits further include digits representing a dialed city.

26. The method of claim 11, wherein said determining step includes the step of determining a dialed country corresponding to a dialed country code.

27. The method of claim 26, wherein said determining step includes the step of determining a dialed city corresponding to said dialed country code and a dialed city code.

28. The method of claim 27, wherein said determining step includes the step of determining said called party's identity corresponding to said dialed country code, said dialed city code, and a dialed phone number.

29. The method of claim 11, wherein said selecting language step includes the step of determining whether said calling party determined a language for delivery of messages to a dialed country.

30. The method of claim 29, wherein said selecting language step includes the step of selecting said language determined for said dialed country.

31. The method of claim 11, wherein said selecting language step includes the step of determining whether said calling party determined a language or dialect for delivery of messages to a dialed city.

32. The method of claim 31, wherein said selecting language step includes the step of selecting said language or dialect determined for said dialed city.

33. The method of claim 11, wherein said selecting language step includes the step determining whether said calling party determined a language or dialect for delivery of messages to a dialed phone number.

34. The method of claim 33, wherein said selecting language step includes the step of selecting said language or dialect determined for said dialed phone number.

35. The method of claim 11, wherein said providing prompt step includes the step of prompting said called party in said language determined by said calling party for a dialed country.

36. The method of claim 11, wherein said providing prompt step includes the step of prompting said called party in a language or dialect determined by said calling party for a dialed city.

37. The method of claim 11, wherein said providing prompt step includes the step of prompting said called party in a language or dialect determined by said calling party for a dialed phone number.

38. An apparatus for providing a called party with audio prompts in a language selected by a calling party, comprising:

means for determining a geographic location of said called party;

means for selecting a language previously determined by said calling party from a plurality of languages for delivery of audio prompts to said called party according to a determined geographic location of said called party; and means for providing said called party with audio prompts in the selected language.

39. The apparatus of claim 38, further comprising means for analyzing a calling party's automatic number identification (ANI) and confirming that said ANI is eligible for language selection service.

40. The apparatus of claim 39, further comprising means for prompting said called party to activate said language selection service.

41. The apparatus of claim 38, wherein said means for determining geographic location includes means for analyzing received dialed digits.

42. The apparatus of claim 41, wherein said received dialed digits include digits that alert a network that a calling party desires to make an international call, digits representing a dialed country code, and digits representing said called party's phone number.

43. The apparatus of claim 42, wherein said received dialed digits further include the digits representing a dialed city code.

44. The apparatus of claim 38, wherein said means for determining geographic location includes means for determining a dialed country that corresponds to a dialed country code.

45. The apparatus of claim 44, wherein said means for determining geographic location includes means for determining a dialed city/region that corresponds to said dialed country code and a dialed city code.

46. The apparatus of claim 38, wherein said means for selecting a language includes means for selecting a language that corresponds to a dialed country.

47. The apparatus of claim 46, wherein said means for selecting a language includes means for selecting a language or dialect that corresponds to said dialed country and a dialed city.

48. An apparatus for providing a called party with audio prompts in a language selected by a calling party, comprising:

means for determining dialed digits that identify said called party;

means for selecting a language previously determined by said calling party from a plurality of languages for delivery of audio prompts in response to determined dialed digits; and means for providing said called party with audio prompts in the selected language.

49. The apparatus of claim 48, further comprising means for enabling said calling party to determine specific languages for delivery of audio prompts to specific countries.

50. The apparatus of claim 49, wherein said means for enabling includes means for recording said calling party's determinations.

51. The apparatus of claim 49, wherein said means for enabling includes means for enabling said calling party to determine a limited number of specific languages for delivery of audio prompts to a limited number of specific countries.

52. The apparatus of claim 48, further comprising means for enabling said calling party to select specific languages or dialects for delivery of audio prompts to specific cities.

53. The apparatus of claim 52, wherein said means for enabling includes means for recording said calling party's determinations.

54. The apparatus of claim 52, wherein said means for enabling includes means for enabling said calling party to determine a limited number of specific languages or dialects for delivery of audio prompts to a limited number of specific cities.

55. The apparatus of claim 48, further comprising means for enabling said calling party to select specific languages or dialects for delivery of audio prompts to specific phone numbers.

56. The apparatus of claim 55, wherein said means for enabling includes means for recording said calling party's determinations.

57. The apparatus of claim 55, wherein said means for enabling includes means for enabling said calling party to determine a limited number of specific languages for delivery of audio prompts to a limited number of phone numbers.

58. The apparatus of claim 48, further comprising means for analyzing said calling party's ANI and confirming that said ANI is eligible for language selection service.

59. The apparatus of claim 58, further comprising means for prompting said calling party to activate said language selection service.

60. The apparatus of claim 48, wherein said means for determining includes means for analyzing received dialed digits.

61. The apparatus of claim 60, wherein said received dialed digits include digits that alert a network that said calling party desires to make an international call, digits representing a dialed country code, and digits representing said called party's phone number.

62. The apparatus of claim 61, wherein said received dialed digits further include digits representing a dialed city.

63. The apparatus of claim 48, wherein said means for determining further comprise means for determining a dialed city/region that corresponds to said dialed country code and a dialed city code.

64. The apparatus of claim 63, wherein said means for determining includes means for determining a dialed city/region corresponding to said dialed country code and a dialed city code.

65. The apparatus of claim 64, wherein said means for determining includes means for determining said called party's identity corresponding to said dialed country code, said dialed city code, and a dialed phone number.

66. The apparatus of claim 48, wherein said means for selecting a language includes means for determining whether said calling party determined a language for delivery of messages to a dialed country.

67. The apparatus of claim 66, wherein said means for selecting a language includes means for selecting said language determined for said country.

68. The apparatus of claim 67, wherein said means for selecting a language includes means for determining whether said calling party determined a language or dialect for delivery of messages to a dialed city.

69. The apparatus of claim 68, wherein said means for selecting a language includes means for selecting said language or dialect determined for said dialed city.

70. The apparatus of claim 48, wherein said means for selecting a language includes means for determining whether said calling party determined a language or dialect for delivery of messages to a dialed phone number.

71. The apparatus of claim 70, wherein said means for selecting a language includes means for selecting said language or dialect determined for said dialed phone number.

72. The apparatus of claim 48, wherein said means for providing prompts includes means for prompting said called party in a language or dialect determined by said calling party for a dialed city.

73. The apparatus of claim 48, wherein said means for providing prompts includes means for prompting said called party in a language or dialect determined by said calling party for a dialed city.

74. The apparatus of claim 48, wherein said means for providing prompts includes means for prompting said called party in a language or dialect determined by said calling party for a dialed phone number.

75. A network based system for providing a called party with audio prompts in a language selected by a calling party, comprising:

an international phone network and a domestic phone network;

a database management system for storing a table of country codes, city codes, and corresponding languages or dialects previously determined by said calling party; and an interactive voice system for providing prompts to said called party in the selected language.

* * * * *